(12) United States Patent
Edamitsu et al.

(10) Patent No.: US 10,274,662 B2
(45) Date of Patent: Apr. 30, 2019

(54) PLANAR ILLUMINATION APPARATUS

(71) Applicant: MINEBEA MITSUMI Inc., Nagano (JP)

(72) Inventors: Takashi Edamitsu, Fukuroi (JP); Mayuko Sugiyama, Fukuroi (JP); Mio Anma, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/968,926

(22) Filed: May 2, 2018

(65) Prior Publication Data

US 2018/0329133 A1    Nov. 15, 2018

(30) Foreign Application Priority Data

May 11, 2017    (JP) .................. 2017-095085

(51) Int. Cl.
*F21V 8/00*    (2006.01)
(52) U.S. Cl.
CPC ......... *G02B 6/0023* (2013.01); *G02B 6/0055* (2013.01); *G02B 6/0088* (2013.01)
(58) Field of Classification Search
CPC .... H05K 5/0069; H05K 5/0247; H05K 5/064; A61B 5/0492; A61B 2562/125; H01R 12/57
See application file for complete search history.

(56) References Cited

U.S. PATENT DOCUMENTS

| | | | |
|---|---|---|---|
| 8,636,373 B2 * | 1/2014 | Kunimochi | G02B 6/0028 349/63 |
| 2015/0070930 A1 * | 3/2015 | Yamada | G02B 19/0066 362/606 |
| 2017/0371095 A1 * | 12/2017 | Tokunaga | G02B 6/0088 |
| 2018/0003879 A1 * | 1/2018 | Furuta | G02B 6/009 |
| 2018/0017728 A1 * | 1/2018 | Edamitsu | G02B 6/0021 |
| 2018/0067252 A1 * | 3/2018 | Edamitsu | G02B 6/0046 |
| 2018/0164484 A1 * | 6/2018 | Tanaka | G02B 6/009 |

FOREIGN PATENT DOCUMENTS

JP    2016-085803 A    5/2016

* cited by examiner

*Primary Examiner* — Tracie Y Green
(74) *Attorney, Agent, or Firm* — Pearne & Gordon LLP

(57) ABSTRACT

A planar illumination apparatus according to an embodiment includes a light guiding plate, a frame member, and an attenuation part. The light guiding plate includes a light extracting surface; and a light incident side surface on which light emitted from a light source is made incident. The light incident side surface is a side surface intersecting with the light extracting surface. The frame member including side walls are arranged to be along side surfaces other than the light incident side surface of the light guiding plate. The side walls are separated from the side surfaces. The attenuation part is arranged close to at least one of the side surfaces other than the light incident side surface to attenuate light emitted from the at least one side surface.

11 Claims, 10 Drawing Sheets

PLANAR ILLUMINATION APPARATUS

CROSS-REFERENCE TO RELATED APPLICATION

The present application claims priority to and incorporates by reference the entire contents of Japanese Patent Application No. 2017-095085 filed in Japan on May 11, 2017.

BACKGROUND OF THE INVENTION

1. Field of the Invention

The present invention relates to a planar illumination apparatus.

2. Description of the Related Art

Conventionally, there has been known a planar illumination apparatus that emits, via a light guiding plate, light produced by a light source such as a Light Emitting Diode (LED). For example, there has been proposed a planar illumination apparatus using a light shielding sheet that is arranged on a side wall of a frame housing the light guiding plate and hides an end portion of the light guiding plate so as to decide a light emitting area. For example, the width of the light shielding sheet of the planar illumination apparatus is narrowed to realize narrowing of a picture frame (see Japanese Laid-open Patent Publication No. 2016-085803).

However, the light guiding plate is to be housed at a fixed distance from the side wall of the frame, because the material characteristic of the light guiding plate causes thermal expansion. Thus, when the width of the light shielding sheet is narrowed to facilitate narrowing of the picture frame, the end part of the light guiding plate is not hidden by the light shielding sheet, and there exists, as a result, possibility that the luminance becomes extremely high at the end portion of the light guiding plate.

The disclosed techniques have been made in view of the aforementioned, and an object of the embodiments is to provide a planar illumination apparatus that is able to enhance uniformity of the luminance.

SUMMARY OF THE INVENTION

A planar illumination apparatus according to an embodiment includes a light guiding plate, a frame member, and an attenuation part. The light guiding plate includes a light extracting surface; and a light incident side surface on which light emitted from a light source is made incident. The light incident side surface is a side surface intersecting with the light extracting surface. The frame member including side walls are arranged to be along side surfaces other than the light incident side surface of the light guiding plate. The side walls are separated from the side surfaces. The attenuation part is arranged close to at least one of the side surfaces other than the light incident side surface to attenuate light emitted from the at least one side surface.

DETAILED DESCRIPTION OF THE PREFERRED EMBODIMENTS

Figure 1:
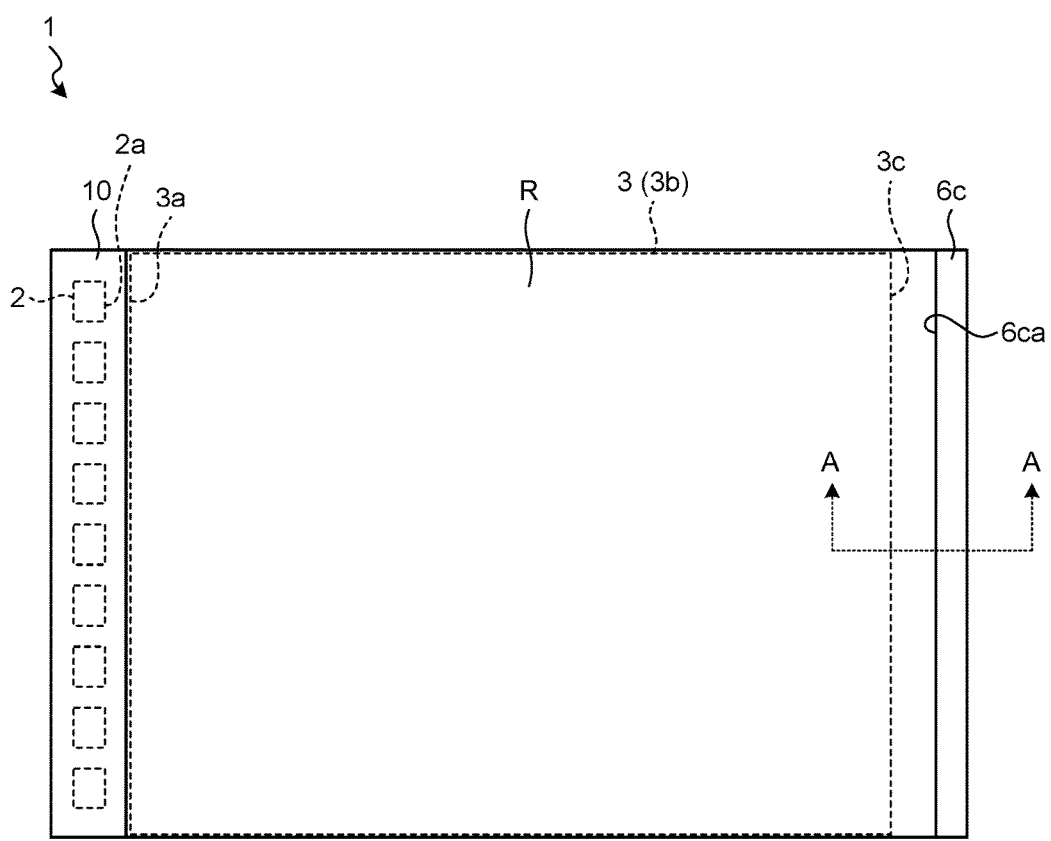
FIG. 1 is a top view illustrating a planar illumination apparatus according to a first embodiment.
Figure 1:
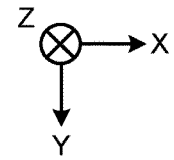

Hereinafter, a planar illumination apparatus according to embodiments will be explained with reference to accompanying drawings. Relations between numeric values of elements and ratios between the elements among other things that are depicted in the drawings are merely one example, and may be different from those of reality. A part or all of the numeric values and the ratios depicted in one of the accompanying drawings may be different from those depicted in another.

Hereinafter, a first embodiment will be explained with reference to FIGS. 1 and 2, a second embodiment will be explained with reference to FIGS. 3 and 4, a third embodiment will be explained with reference to FIG. 5, and a fourth embodiment will be explained with reference to FIGS. 6 and 7A to 7C.

An outline of a planar illumination apparatus 1 according to the first embodiment will be explained with reference to FIGS. 1 and 2. FIG. 1 is a top view illustrating the planar illumination apparatus 1 according to the first embodiment. FIG. 2 is a cross sectional view illustrating the planar illumination apparatus 1 according to the first embodiment. In FIG. 1, for convenience of explanation, a three-dimensional orthogonal coordinate system is illustrated of which positive direction of the Z-axis is a light emitting direction of a light guiding plate 3 of the planar illumination apparatus 1. The above-mentioned orthogonal coordinate system may be also illustrated in other drawings that are used in the following explanation. In FIG. 2, a cross section of the planar illumination apparatus 1 when the planar illumination apparatus 1 is cut along a line A-A illustrated in FIG. 1 is illustrated.

The planar illumination apparatus 1 according to the embodiment is used as a backlight of a liquid crystal display apparatus, for example. The above-mentioned liquid crystal display apparatus is used as a display device of an electronic apparatus such as a smartphone, a mobile telephone, and a personal computer.

As illustrated in FIG. 1, the planar illumination apparatus 1 according to the embodiment is constituted of light sources 2, the light guiding plate 3, and light shielding parts 10 and 6c.

The light sources 2 are Light Emitting Diodes (LEDs), for example, and emit light from their light emitting surfaces 2a facing a light incident side surface 3a of the light guiding plate 3 toward the light incident side surface 3a, namely in the positive direction of the X-axis. The number of the light sources 2 is two or more, and the light sources 2 are aligned along the light guiding plate 3 in the Y-axis direction.

The light sources 2 are joined with a Flexible Printed Circuit (FPC) whose surface opposite to the light emitting surfaces 2a is a power-supply circuit. In other words, the light sources 2 is a light source having a top-view type whose FPC to be mounted is substantially parallel to the light emitting surfaces 2a. The light sources 2 are not limited to the light source having the top-view type, may be a light source having a side-view type whose FPC to be mounted is perpendicular to the light emitting surfaces 2a.

The light guiding plate 3 is a member formed in a plate-like shape, which is made of a transparent material such as polycarbonate resin. The light guiding plate 3 has the light incident side surface 3a, an emitting surface 3b, a side surface 3c, and an opposite surface 3d (see FIG. 2).

The light incident side surface 3a is facing the light emitting surfaces 2a of the light sources 2, and is a side surface on which lights emitted from the light sources 2 are made incident. The emitting surface 3b is a principal surface in the positive direction of the Z-axis that is a light emitting direction, and the lights made incident on the light incident side surface 3a are emitted from the emitting surface 3b. In other words, the emitting surface 3b is a light extracting surface from which the lights emitted from the light sources 2 are mainly extracted. The light incident side surface 3a and the emitting surface 3b (light extracting surface) have a positional relation of intersection with each other.

The side surface 3c is a side surface opposite to the light incident side surface 3a among side surfaces other than the light incident side surface 3a. The light made incident on the light guiding plate 3 is partially emitted from the side surface 3c, in addition to the emitting surface 3b. The opposite surface 3d is a principal surface on the reverse side of the emitting surface 3b of the light guiding plate 3.

Each of the light shielding parts 6c and 10 is a member formed in a sheet-like shape, for example, and shields the light emitted from the light guiding plate 3 so as to decide an effective area R that is a light emitting area of the planar illumination apparatus 1. Specifically, the light shielding part 10 is arranged along the light incident side surface 3a of the light guiding plate 3 and covers the light sources 2 so as to shield at least a part of the lights emitted from the light sources 2, which is emitted in an emitting direction (positive direction of Z-axis) without going through the light guiding plate 3.

The light shielding part 6c is an extending part that extends from a frame 6 (see FIG. 2) to be mentioned later. The light shielding part 6c is arranged along the side surface 3c of the light guiding plate 3. An end part 6ca of the light shielding part 6c, which is close to the light guiding plate 3, is separated from the side surface 3c (in other words, light shielding part 6c and light guiding plate 3 are not overlapped with each other when viewed from the top). The width of the light shielding part 6c is narrower than that of the light shielding part 10 located close to the light incident side surface 3a. In other words, the width of the light shielding part 6c is narrowed, so that it is possible to widen the effective area R, namely, it is possible to realize narrowing of a picture frame.

In FIG. 1, the case has been explained in which the side surface 3c opposite to the light incident side surface 3a and the light shielding part 6c are not overlapped with each other when viewed from the top; however, a side surface that is adjacent to the light incident side surface 3a and a light shielding part corresponding to this side surface may be non-overlapped with each other. In other words, it is sufficient that at least one of the three side surfaces other than the light incident side surface 3a and a corresponding light shielding part are not overlapped with each other. Details of this point will be mentioned later with reference to FIG. 10.

Next, a cross-sectional structure of the planar illumination apparatus 1 according to the embodiment will be explained with reference to FIG. 2. In FIG. 2, a part of loci of light that has gone through the light guiding plate 3 is depicted by using dashed lines. As illustrated in FIG. 2, the planar illumination apparatus 1 according to the embodiment is further constituted of a reflection part (reflection sheet) 4, an optical sheet 5, and the frame 6.

The reflection part 4 is a member that is formed in a sheet-like shape, for example, and is arranged along the opposite surface 3d of the light guiding plate 3 so as to reflect light from the light guiding plate 3 and return the leaked light to the light guiding plate 3. An end part 4a of the reflection part 4 is arranged at an inner position (in FIG. 2, at more negative position along X-axis) than the side surface 3c. In other words, the reflection part 4 is arranged on a reverse face side of the emitting surface 3b, which is a light extracting surface, and is arranged at the inner position than the side surface 3c other than the light incident side surface 3a, so as to reflect light toward the light guiding plate 3.

The optical sheet 5 is a member that is arranged close to the emitting surface 3b of the light guiding plate 3, is extending to the light shielding part 6c, and has optical characteristics. Specifically, the optical sheet 5 has a diffusion sheet 5a and a prism sheet 5b.

The diffusion sheet 5a is a member that is laminated on the emitting surface 3b of the light guiding plate 3 so as to diffuse light emitted from the emitting surface 3b. The prism sheet 5b is a member that is laminated on the diffusion sheet 5a and performs light distributing control on the light diffused by the diffusion sheet 5a so as to emit light on which the light distributing control has performed.

The frame 6 is a frame member that houses the light sources 2, the light guiding plate 3, the reflection part 4, and the optical sheet 5. The frame 6 is a member that is made of a material such as a metal and a resin, and has a high rigidity. The light reflectance of the frame 6 is lower than that of the reflection part 4.

Figure 2:
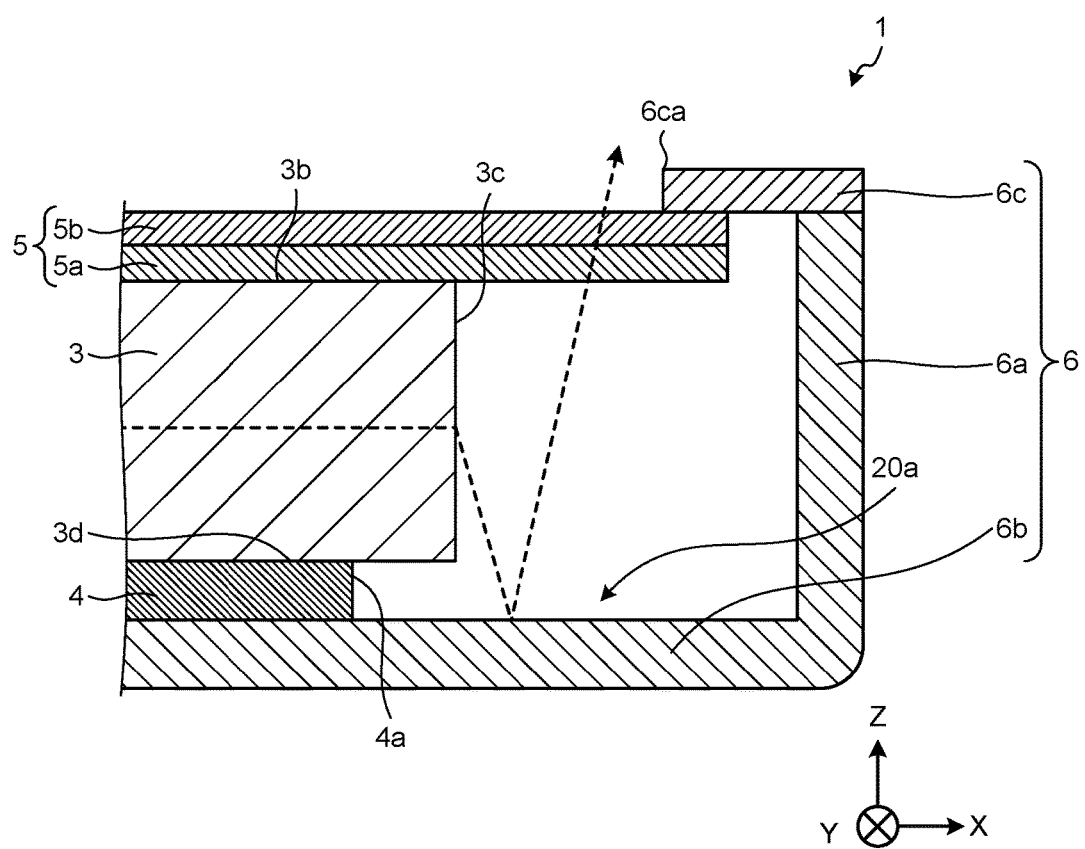
FIG. 2 is a cross sectional view illustrating the planar illumination apparatus according to the first embodiment.
Figure 3:
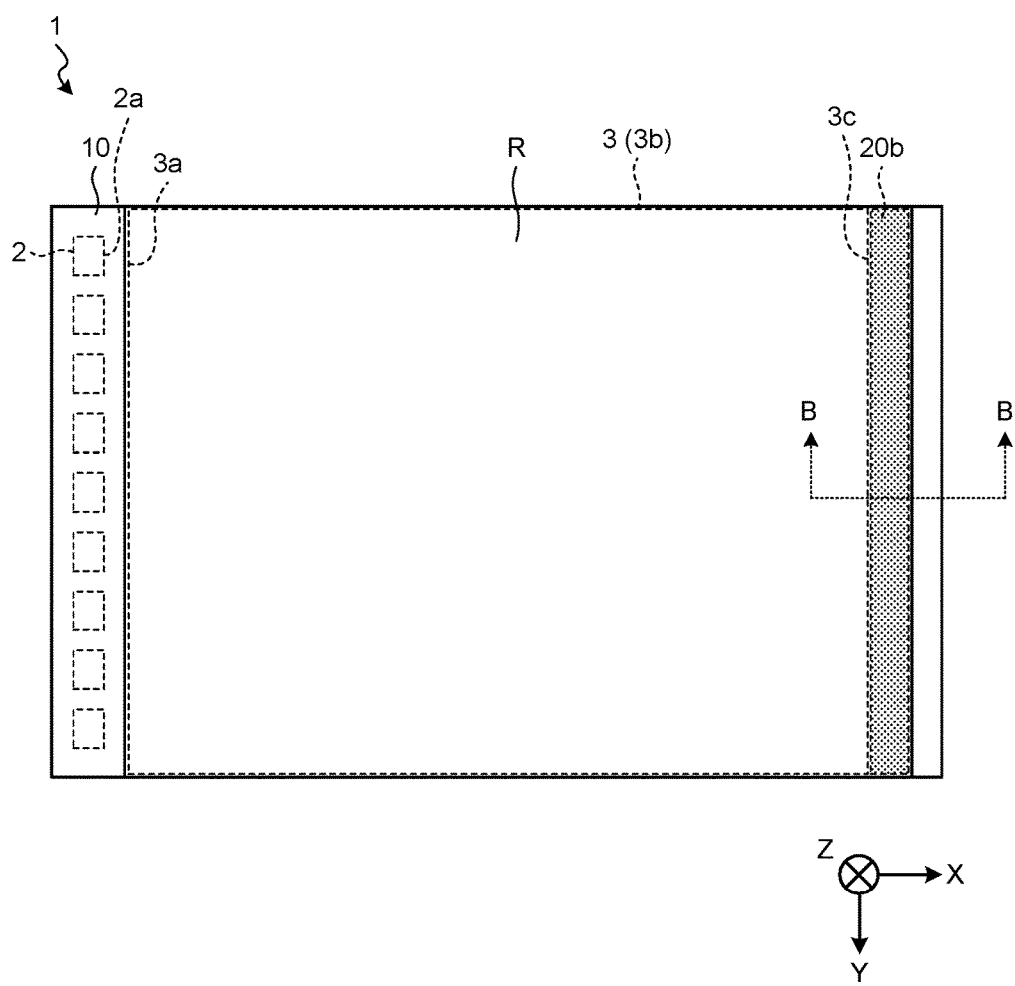
FIG. 3 is a top view illustrating a planar illumination apparatus according to a second embodiment.

As illustrated in FIG. 2, the frame 6 has a side wall 6a, a bottom wall 6b, and the light shielding part 6c. The side wall 6a is a portion that is facing the side surface 3c other than the light incident side surface 3a. The bottom wall 6b is a portion that is arranged close to the opposite surface 3d of the light guiding plate 3.

The light shielding part 6c is an extending portion that extends, from the end part of the side wall 6a close to the emitting surface 3b, to a position between the side wall 6a and the side surface 3c of the light guiding plate 3 that is facing the side wall 6a. Specifically, the end part 6ca of the light shielding part 6c extends, from the side wall 6a, toward the side surface 3c in the negative direction of the X-axis. The light shielding part 6c may be formed as a portion of the frame 6, or may be configured as a member other than the frame 6.

As illustrated in FIG. 2, the frame 6, which is a frame member, houses the light guiding plate 3 while interposing a constant distance between the frame 6 and the side surface 3c of the light guiding plate 3. In other words, the frame 6 is arranged to be separated from the side surface 3c. This is because the light guiding plate 3 is thermally expanded by characteristics of the material. Specifically, when the light guiding plate 3 is thermally expanded, the side surface 3c of the light guiding plate 3 approaches the side wall 6a. Thus, the side wall 6a is separated from the side surface 3c at a normal temperature to be able to prevent a contact between the side wall 6a and the side surface 3c.

Meanwhile, in the planar illumination apparatus, there exists the possibility that uniformity of the luminance is reduced when narrowing of a picture frame is proceeded. For example, in the planar illumination apparatus, when a side surface of the light guiding plate and a side wall of the frame is separated from each other, it is estimated that light emitted from the side surface is diffusely reflected, or is reflected from the reflection part, and light is emitted from a space between the light shielding part and the side surface of the light guiding plate so as to generate a bright line having an extremely high luminance along side surfaces other than a light incident side surface of the light guiding plate. In this manner, there exists possibility that generation of the bright line having an extremely high luminance causes reduction in uniformity of the luminance.

Therefore, the planar illumination apparatus 1 according to the embodiment is constituted of an attenuation part 20 (attenuation parts 20a to 20f) that is arranged on at least a part (in FIG. 2, side surface 3c) of the side surfaces other than the light incident side surface 3a of the light guiding plate 3 so as to attenuate light emitted from this side surface. In other words, the attenuation part 20 according to the embodiment attenuates the light emitted from the side surface 3c, and suppresses the extremely high luminance so as to prevent generation of the bright line. Therefore, by employing the planar illumination apparatus 1 according to the embodiment, it is possible to improve uniformity of the luminance.

Hereinafter, the attenuation parts 20a to 20f will be explained with reference to FIGS. 2 to 9. The attenuation parts 20a to 20f are arranged, but not limited thereto, close to the side surface 3c on an opposite side of the light incident side surface 3a, it is sufficient that the attenuation parts 20a to 20f are arranged close to any of side surfaces other than the light incident side surface 3a (see FIG. 1). This point will be mentioned later with reference to FIG. 10.

The attenuation part 20a according to the first embodiment will be explained with reference to FIG. 2. As described above, the reflection part 4 is arranged at an inner position than the side surface 3c. As illustrated in FIG. 2, the attenuation part 20a according to the first embodiment is formed as the bottom wall 6b of the frame 6. Specifically, the attenuation part 20a is a region of the bottom wall 6b of the frame 6 (frame member) that is not overlapped with the reflection part 4.

More specifically, the attenuation part 20a is arranged closer to the side wall 6a than the end part 4a of the reflection part 4. Namely, light emitted from the side surface 3c of the light guiding plate 3 is reflected from not the reflection part 4 but the bottom wall 6b. In other words, the reflectance of the bottom wall 6b (attenuation part 20a) is lower than that of the reflection part 4, and thus the reflected light is more attenuated than a case where the light is reflected from the reflection part 4.

In this manner, when the attenuation part 20a is formed as a part of the frame 6, it is possible to attenuate the light without additionally providing any new member. Therefore, according to the first embodiment, it is possible to improve uniformity of the luminance while reducing a product cost.

Next, the second embodiment will be explained with reference to FIGS. 3 and 4. Note that in FIGS. 3 and 4, a part different from the first embodiment will be mainly described, and the common parts are represented with same symbols and the description is omitted appropriately. FIG. 3 is a top view illustrating the planar illumination apparatus 1 according to the second embodiment.

The second embodiment is different from the first embodiment in that a light absorbing member for absorbing light is additionally provided as the attenuation part 20b. Specifically, as illustrated in FIG. 3, the attenuation part 20b is a light absorbing member that is arranged close to the side surface 3c opposite to the light incident side surface 3a of the light guiding plate 3. More specifically, the attenuation part 20b is arranged along a whole of the side surface 3c, and is arranged on a whole of the region between the side surface 3c and the light shielding part 6c.

Not limited to the case where the attenuation part 20b is arranged along the whole of the side surface 3c of the light guiding plate 3, the attenuation part 20b may be arranged along a part of the side surface 3c. Not limited to the case where the attenuation part 20 is arranged on the whole of the region between the side surface 3c and an end part 11a, the attenuation part 20 may be arranged on a part of the region between the side surface 3c and the end part 11a.

Next, a cross section of the planar illumination apparatus 1 according to the second embodiment will be explained with reference to FIG. 4. FIG. 4 is a cross sectional view illustrating the planar illumination apparatus 1 according to the second embodiment. In FIG. 4, a cross section of the planar illumination apparatus 1 when the planar illumination apparatus 1 is cut along a line B-B illustrated in FIG. 3 is illustrated.

Here, the reflection part 4 according to the second embodiment is, similarly to the case according to the first embodiment, arranged at an inner position than the side surface 3c. As illustrated in FIG. 4, the attenuation part 20b is arranged on the bottom wall 6b of the frame 6. Specifically, the attenuation part 20b is arranged close to the opposite surface 3d, and arranged at a position closer to the side wall 6a than the side surface 3c with respect to the positive direction of the X-axis.

The attenuation part 20b may be constituted of a member that absorbs light, such as a black resin. Not limited to the black resin, any color or any material may be employed for the attenuation part 20b when reflectance of the attenuation part 20b is lower than that of the reflection part 4.

Thus, when light emitted from the side surface 3c is absorbed, light emitted toward the emitting surface 3b, which is the positive direction of the Z-axis, is able to be attenuated, so that it is possible to improve uniformity of the luminance. As illustrated in FIG. 4, in a case where the attenuation part 20 is provided as an additional member, when a color or a material to be employed is changed, it is possible to easily adjust an amount of the emitted light.

Figure 4:
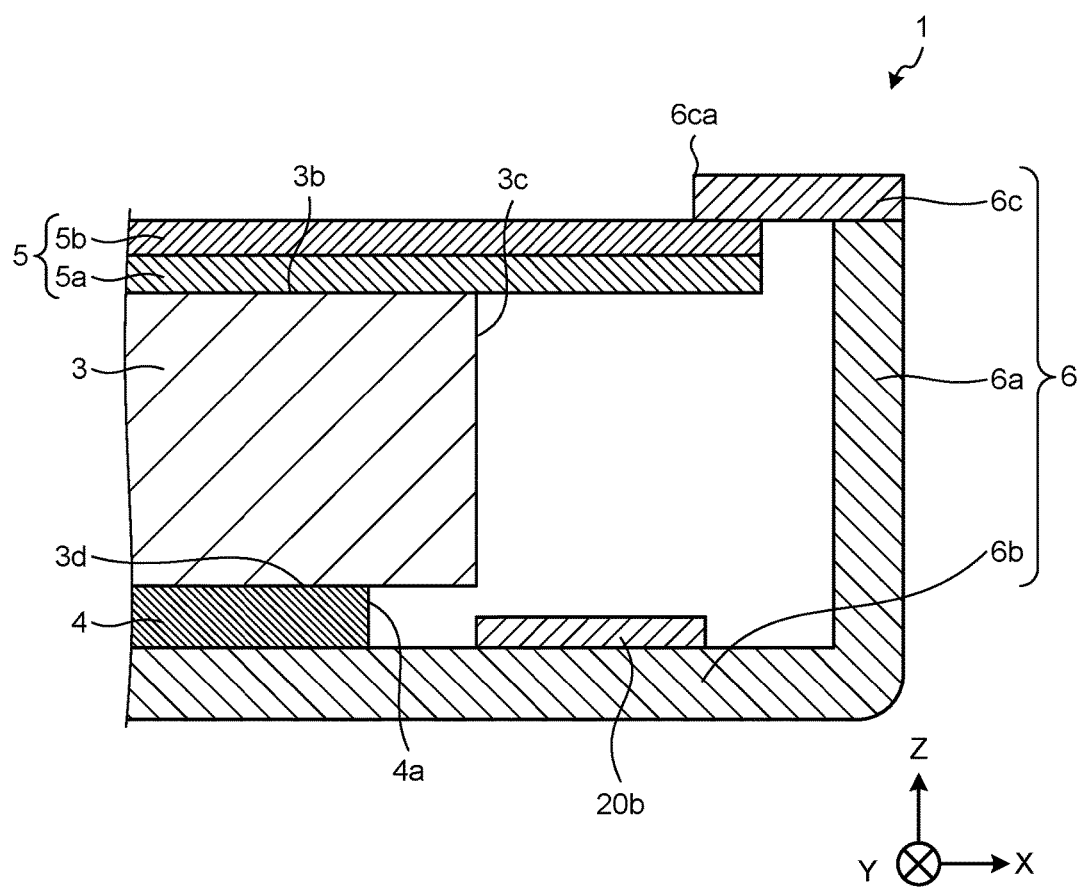
FIG. 4 is a cross sectional view illustrating the planar illumination apparatus according to the second embodiment.

In FIG. 4, the attenuation part 20b is fixed to only the bottom wall 6b of the frame 6; however, the attenuation part 20b may be arranged on the side wall 6a in addition to the bottom wall 6b, for example. Thus, it is possible to attenuate light emitted from the side surface 3c toward the side wall 6a, which is the positive direction of the X-axis.

Next, the third embodiment will be explained with reference to FIG. 5. FIG. 5 is a cross sectional view illustrating the planar illumination apparatus 1 according to the third embodiment. The third embodiment is different from the second embodiment in that the attenuation part 20c, which is a light absorbing member, is arranged on the reflection part 4.

Figure 5:
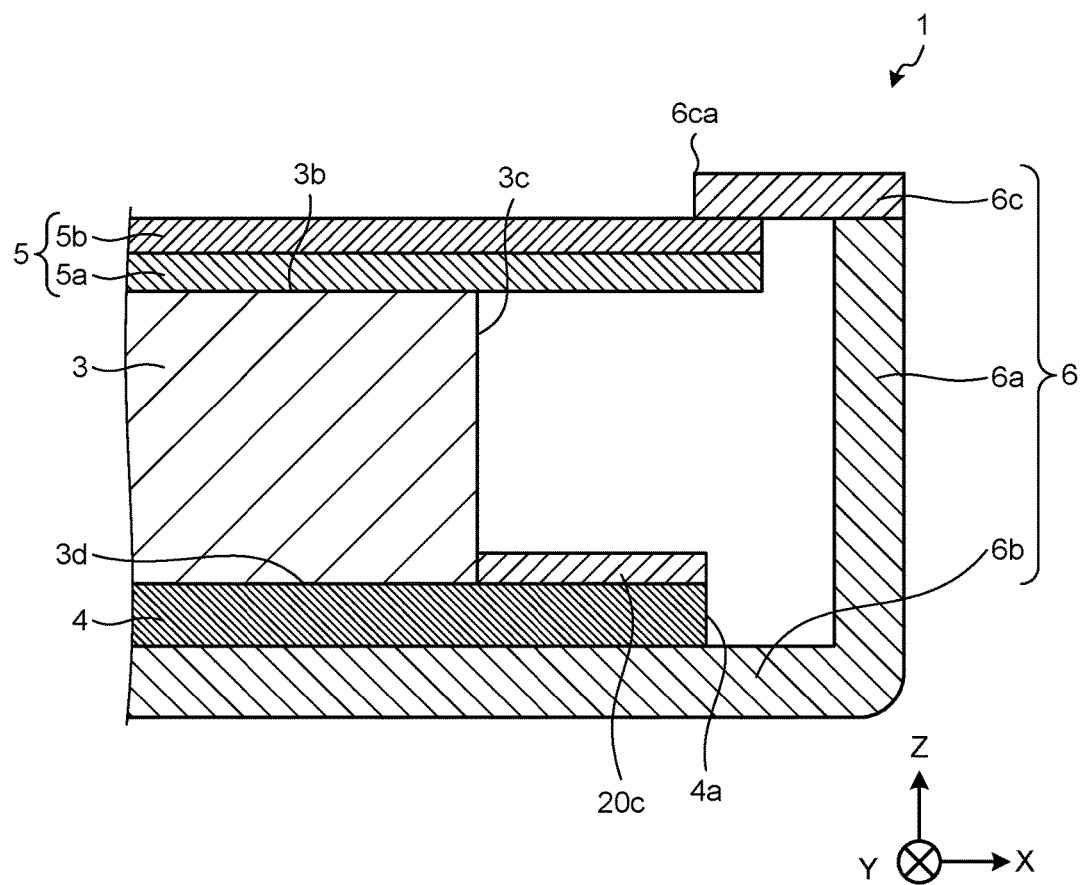
FIG. 5 is a cross sectional view illustrating a planar illumination apparatus according to a third embodiment.

Here, as illustrated in FIG. 5, the end part 4a of the reflection part 4 protrudes from the side surface 3c toward the side wall 6a. In other words, the reflection part 4 is arranged along the opposite surface 3d, and further protrudes toward the side wall 6a from the side surface 3c other than the light incident side surface 3a.

The attenuation part 20c according to the third embodiment is arranged on the above-mentioned protruded part of the reflection part 4. Specifically, the attenuation part 20c is arranged close to an end of the protruded part in the positive direction of the Z-axis that is the emitting direction. Similarly to the case according to the second embodiment, the attenuation part 20c is a light absorbing member having a lower reflectance than the reflection part 4.

Thus, when light emitted from the side surface 3c is absorbed, light emitted toward the emitting surface 3b, which is the positive direction of the Z-axis, is able to be attenuated, so that it is possible to improve uniformity of the luminance.

The attenuation part 20c may not only absorb light, but also transmit a part of the light. In other words, the attenuation part 20c causes the reflection part 4 to reflect the light having transmitted the attenuation part 20c. Thus, it is possible to adjust the luminance without providing any new member in addition to the attenuation part 20c.

Figure 6:
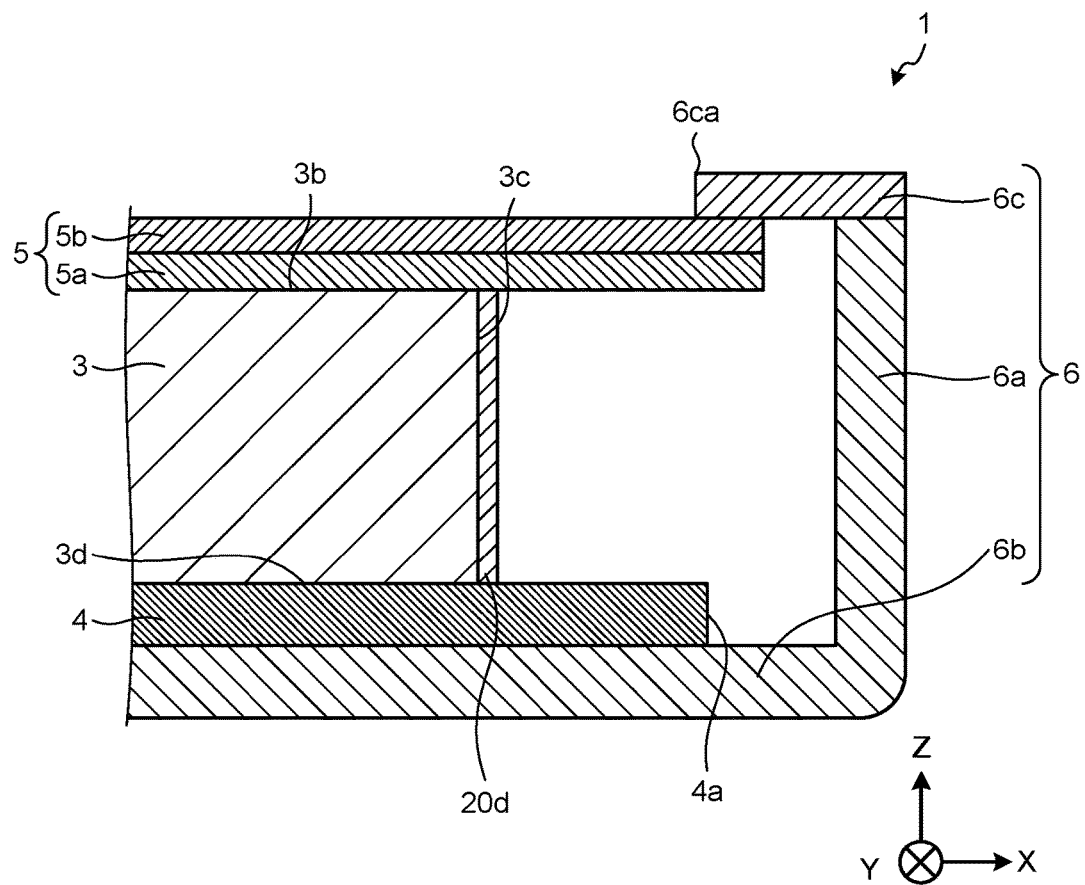
FIG. 6 is a cross sectional view illustrating a planar illumination apparatus according to a fourth embodiment.

Next, the fourth embodiment will be explained with reference to FIG. 6. FIG. 6 is a cross sectional view illustrating the planar illumination apparatus 1 according to the fourth embodiment. The fourth embodiment is different form the other embodiments in that the attenuation part 20d, which is a light absorbing member, directly covers the side surface 3c.

Specifically, as illustrated in FIG. 6, the attenuation part 20d is arranged along the side surface 3c of the light guiding plate 3. More specifically, the attenuation part 20d is arranged so as to cover a whole of the side surface 3c of the light guiding plate 3. Thus, light emitted from the side surface 3c of the light guiding plate 3 is able to be reduced, so that it is possible to attenuate light emitted from a space between the light shielding part 6c and the side surface 3c.

In the example illustrated in FIG. 6, the case is depicted in which the attenuation part 20d is arranged so as to cover the whole of the side surface 3c; however, not limited thereto, the attenuation part 20d may be arranged so as to cover a part of the side surface 3c. In other words, the attenuation part 20d covers at least a part (in FIG. 6, side surface 3c) of the side surfaces other than the light incident side surface 3a. Here, this point will be explained with reference to FIGS. 7A to 7C.

Figure 7A:
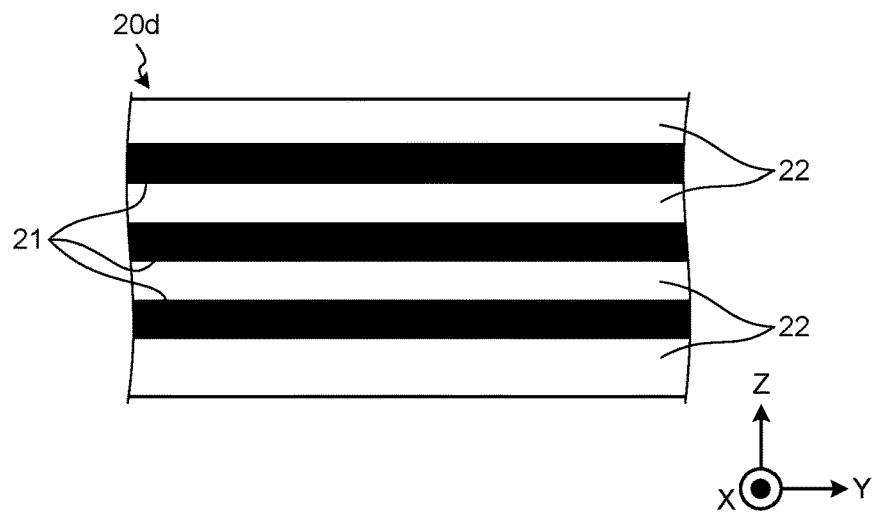
FIG. 7A is a diagram illustrating a pattern configuration of a light shielding part.
Figure 7B:
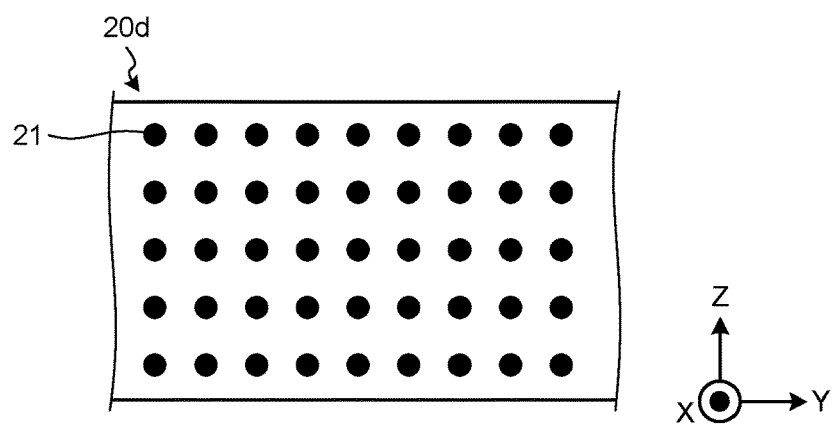
FIG. 7B is a diagram illustrating a pattern configuration of the light shielding part.
Figure 7C:
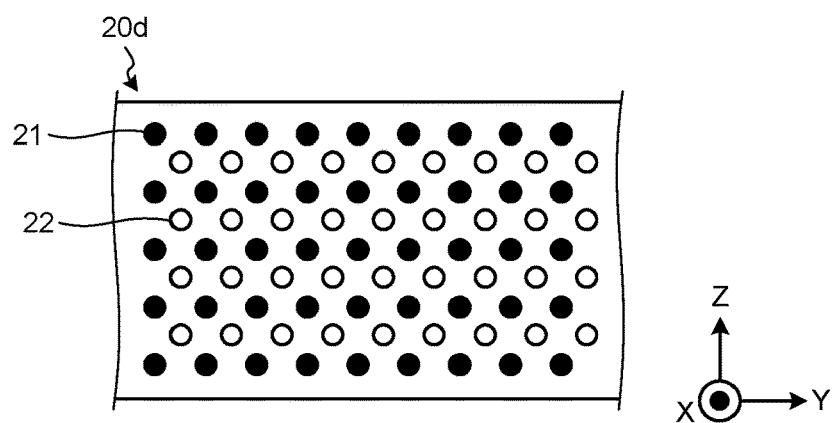
FIG. 7C is a diagram illustrating a pattern configuration of the light shielding part.

FIGS. 7A to 7C are diagrams illustrating pattern configurations of the light shielding part. In FIGS. 7A to 7C, the attenuation part 20d illustrated in FIG. 6 is viewed from the side wall 6a toward the side surface 3c (namely, from positive to negative direction of X-axis). The pattern configurations illustrated in FIGS. 7A to 7C are able to be applied not only to the attenuation part 20d according to the fourth embodiment, but also to any of the attenuation parts 20 (for example, attenuation parts 20b to 20f) according to the other embodiments.

As illustrated in FIG. 7A, the attenuation part 20d has a band-like pattern obtained by alternating a black-colored member 21 and a white-colored member 22, for example. In other words, the attenuation part 20d absorbs light by using the black-colored members 21, and reflects light by using the white-colored members 22. Thus, it is possible to easily adjust an amount of light to be emitted.

The black-colored member 21 and the white-colored member 22 may be made from the same member, or different members. When the black-colored member 21 and the white-colored member 22 are made from the same member, for example, either of black and white paints is painted on an adhesive sheet-like member to produce the black-colored member 21 or the white-colored member 22.

The pattern has been explained to be obtained by alternating the black-colored member 21 and the white-colored member 22 in the up-and-down direction (Z-axis direction), not limited thereto, the pattern may be obtained by alternating the black-colored member 21 and the white-colored member 22 in the right-and-left direction (Y-axis direction), or the pattern may be obtained by alternating the black-colored member 21 and the white-colored member 22 in both of the up-and-down and right-and-left directions. An area ratio between the black-colored members 21 and the white-colored members 22 is able to be arbitrary set in accordance with the amount of the emitted light.

The attenuation part 20d may have, not limited to the band-like pattern, a dot pattern as illustrated in FIGS. 7B and 7C. Specifically, as illustrated in FIG. 7B, the black-colored members 21, each of which is formed in a circular shape, may be arranged on the attenuation part 20d in a dot pattern, for example. In the example illustrated in FIG. 7B, each of the black-colored members 21 of the attenuation part 20d is indicated by using a circular shape; however, any of them may be formed in an arbitrary shape such as a rectangular shape and a triangular shape.

As illustrated in FIG. 7C, the white-colored members 22 may be arranged on the attenuation part 20d in a dot pattern, in addition to the black-colored members 21. Specifically, the black-colored members 21 and the white-colored members 22 are arranged on the attenuation part 20d so that intervals between adjacent dots are similar or the same, and further sizes of the dots are uniformed. Thus, it is possible to prevent light reflected from the attenuation part 20d from being non-uniform. An area ratio between the black-colored members 21 and the white-colored members 22 may be arbitrary set in accordance with the amount of the light to be emitted.

In FIG. 7C, the black-colored members 21 and the white-colored members 22 are arranged on the attenuation part 20d so that intervals between adjacent dots are similar or the same, the intervals between adjacent dots may be lopsided. The sizes of the dots are not to be similar or the same, and may be non-uniform.

The pattern of the attenuation part 20d is not limited to any of those illustrated in FIGS. 7A to 7C, it is sufficient that the pattern absorbs a part of light emitted from the side surface 3c and reflects a part of the light.

It is sufficient that the attenuation part 20 is able to attenuate the light emitted from the side surface 3c, and thus the attenuation part 20 is not limited to the attenuation parts 20 according to the above-mentioned first to fourth embodiments. Here, other examples of the attenuation parts 20 will be explained with reference to FIGS. 8 and 9.

Figure 8:
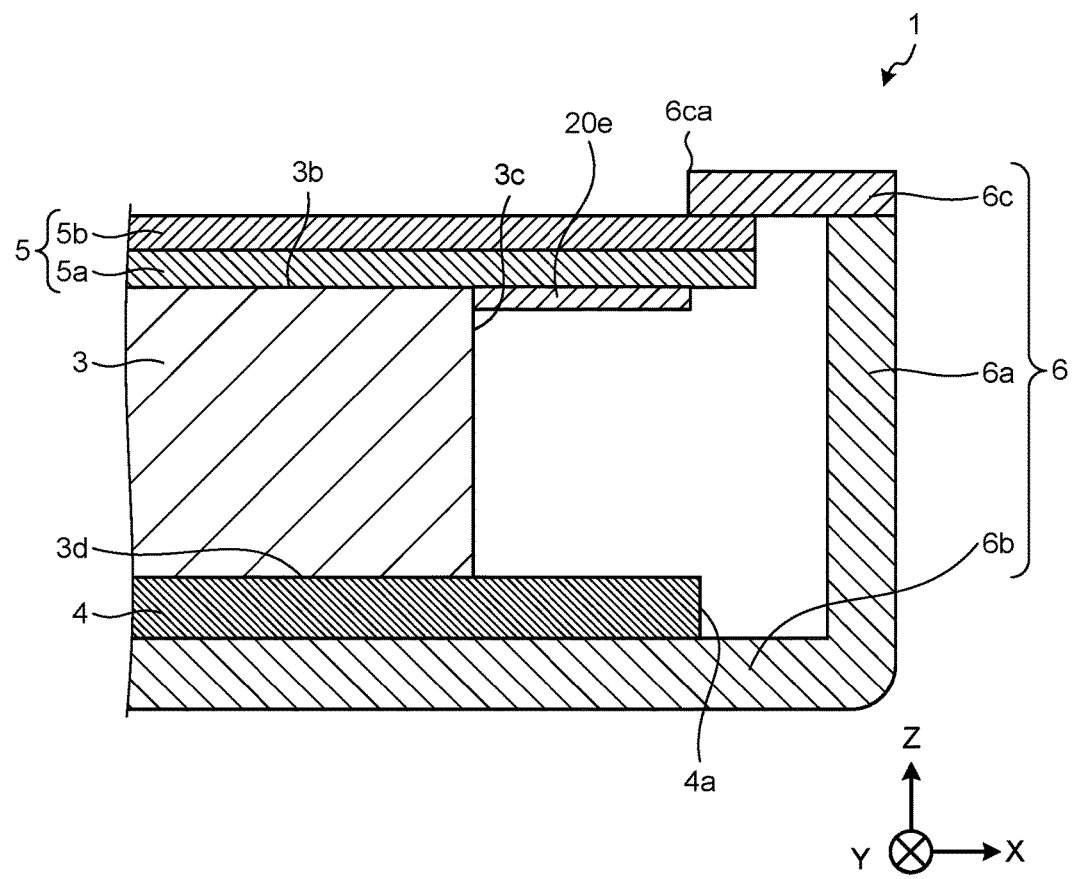
FIG. 8 is a cross sectional view illustrating a planar illumination apparatus according to a modification.
Figure 9:
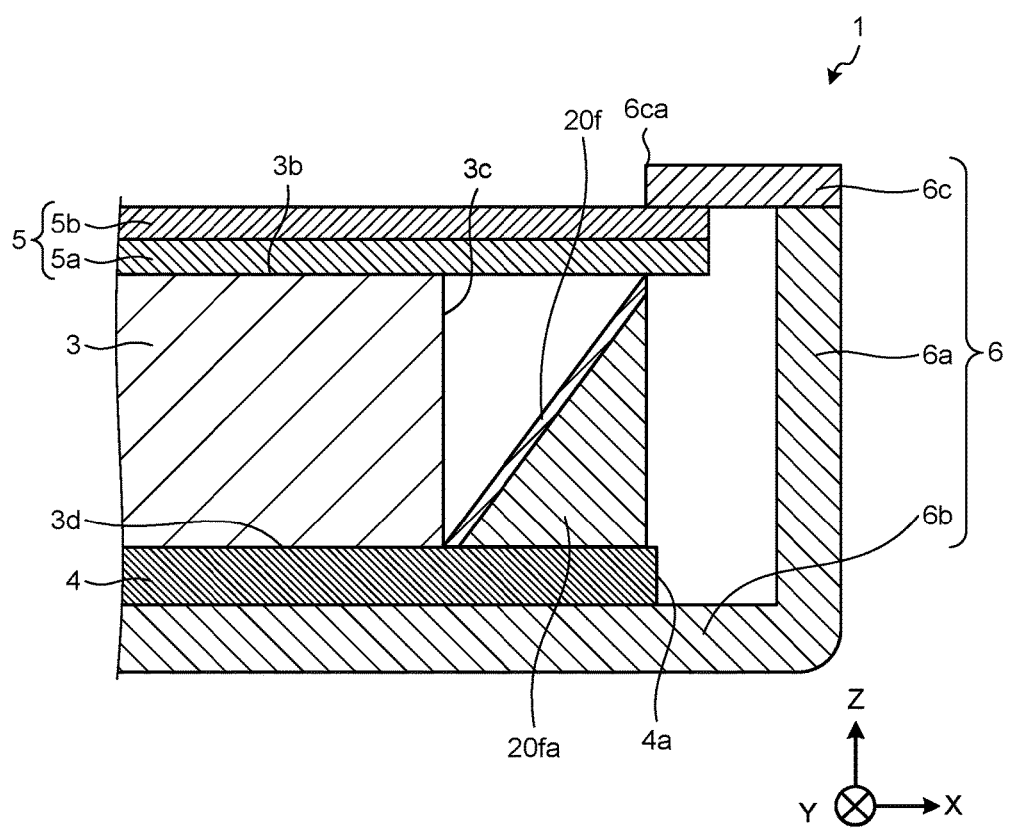
FIG. 9 is a cross sectional view illustrating a planar illumination apparatus according to a modification.

FIGS. 8 and 9 are cross sectional views illustrating planar illumination apparatuses according to modifications. As illustrated in FIG. 8, the attenuation part 20e is arranged close to the emitting surface 3b of the light guiding plate 3. More specifically, the attenuation part 20e is arranged on a portion of the diffusion sheet 5a that is close to the reflection part 4 with respect to the negative direction of the Z-axis.

In other words, the attenuation part 20e is arranged in consideration of lights emitted in various directions that are caused by diffuse reflection when light is emitted from the side surface 3c. In other words, the attenuation part 20e attenuates light at a position close to the emitting surface 3b, so that it is possible to stabilize the amount of the light emitted from the emitting surface 3b.

In the example illustrated in FIG. 8, the attenuation part 20e is arranged at a position on the diffusion sheet 5a close to the reflection part 4, for example, the attenuation part 20e may be arranged between the diffusion sheet 5a and the prism sheet 5b, furthermore, the attenuation part 20e may be arranged on a light emitting side of the prism sheet 5b (positive direction of Z-axis). Note that the attenuation part 20e may be directly provided on a surface of the diffusion sheet 5a and/or the prism sheet 5b by printing etc.

As illustrated in FIG. 9, the attenuation part 20f may be inclined. Specifically, as illustrated in FIG. 9, the attenuation part 20f is arranged on a slope that is included in a base 20fa. The base 20fa includes the slope that is rising when viewed from the side surface 3c.

Thus, light emitted from the side surface 3c is not reflected from the side wall 6a, the bottom wall 6b, etc. of the frame 6 to be absorbed, so that it is possible to minimize a loss in the light. Moreover, a part of the light emitted from the side surface 3c is absorbed, and the remaining light is reflected toward the emitting surface 3b, it is possible to easily adjust the amount of light.

In the above-mentioned embodiments, the case is explained in which the light shielding part 6c is arranged close to only the side surface 3c that is opposite to the light incident side surface 3a; however, it is sufficient that the light shielding part 6c may be arranged close to any side surface other than the light incident side surface 3a. This point will be explained with reference to FIG. 10.

Figure 10:
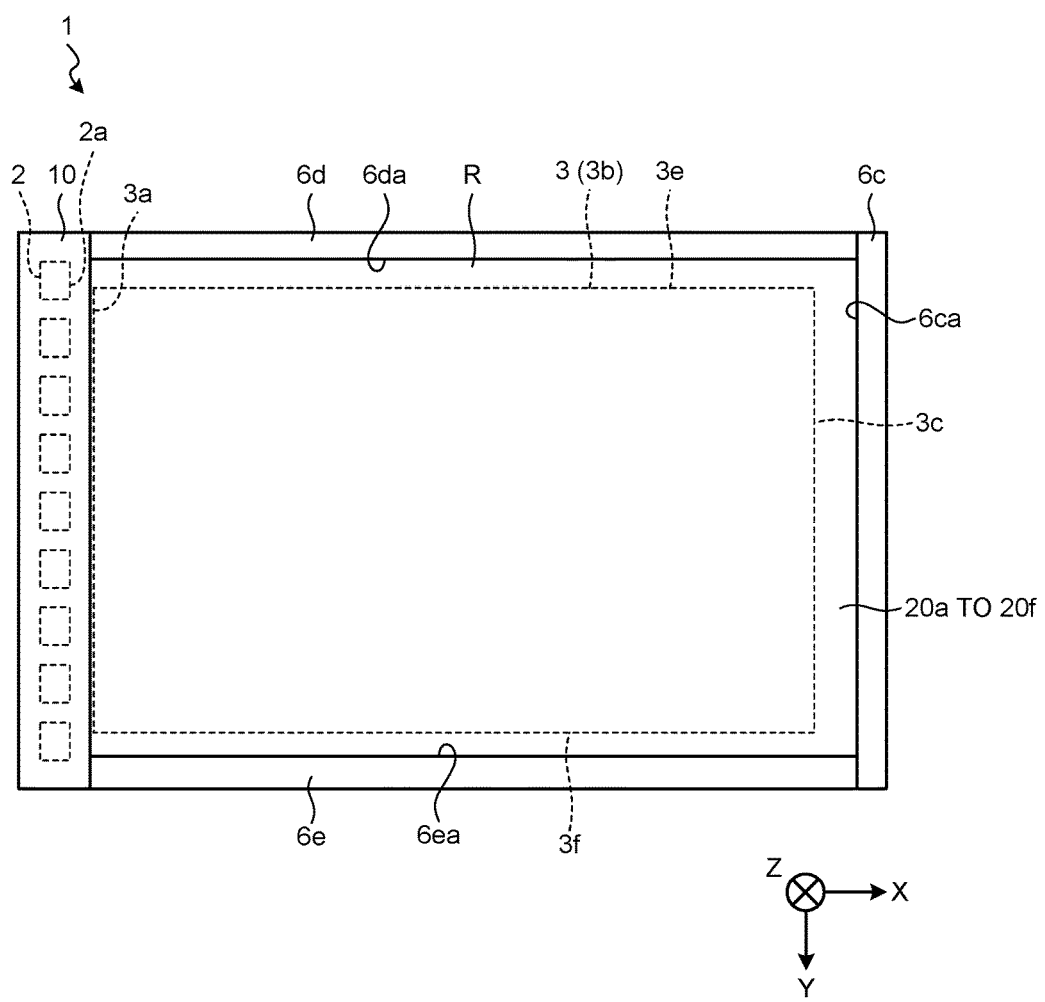
FIG. 10 is a top view illustrating a planar illumination apparatus according to a modification.

FIG. 10 is a top view illustrating the planar illumination apparatus 1 according to a modification. As illustrated in FIG. 10, the light shielding parts 6c, 6d, and 6e are respectively arranged close to the side surfaces 3c, 3e, and 3f that are other than the light incident side surface 3a of the light guiding plate 3. Specifically, as described above, the light shielding part 6c is arranged close to the side surface 3c that is opposite to the light incident side surface 3a. The light shielding parts 6d and 6e are respectively arranged close to the side surfaces 3e and 3f that are individually adjacent to the light incident side surface 3a.

The end parts 6ca, 6da, and 6ea of the light shielding parts 6c, 6d, and 6e are respectively separated from the side surfaces 3c, 3e, and 3f. The attenuation parts 20 are arranged close to the respective side surfaces 3c, 3e, and 3f so as to attenuate lights emitted from the side surfaces 3c, 3e, and 3f. Any of the attenuation parts 20a to 20f according to the above-mentioned embodiment may be applied to the attenuation part 20.

In FIG. 10, the case is exemplified in which the attenuation parts 20 are arranged close to all of the side surfaces 3c, 3e, and 3f other than the light incident side surface 3a; however, the one or more attenuation parts 20 may be arranged close to any one or two of the side surfaces 3c, 3e, and 3f among the three side surfaces 3c, 3e, and 3f other than the light incident side surface 3a. In other words, it is sufficient that the one or more attenuation parts 20 are arranged close to at least one of the side surfaces 3c, 3e, and 3f other than the light incident side surface 3a.

As described above, the planar illumination apparatus 1 according to the embodiment includes the light guiding plate 3, a frame member (frame 6), and any one of the attenuation parts 20a to 20f. The light guiding plate 3 includes a light extracting surface (emitting surface 3b); and the light incident side surface 3a on which light emitted from the light sources 2 is made incident. The light incident side surface 3a is a side surface intersecting with the light extracting surface. The frame member is arranged to be along the side surfaces 3c, 3e, and 3f other than the light incident side surface 3a of the light guiding plate 3. The frame member is separated from the side surfaces 3c, 3e, and 3f. Any one of the attenuation parts 20a to 20f is arranged close to at least one of the side surfaces 3c, 3e, and 3f other than the light incident side surface 3a to attenuate light emitted from the at least one of the side surfaces 3c, 3e, and 3f. Thus, it is possible to suppress the extremely high luminance so as to prevent generation of the bright line. Therefore, it is accordingly possible to improve uniformity of the luminance.

In the planar illumination apparatus 1 according to the embodiment, the frame member (frame 6) includes; (i) the side wall 6a that is opposite to the at least one of the side surfaces 3c, 3e, and 3f other than the light incident side surface 3a; and (ii) an extending part (light shielding part 6c) that extends from an end part of the side wall 6a on a side of the light extracting surface (emitting surface 3b) to a position between the side wall 6a and the at least one of the side surfaces 3c, 3e, and 3f of the light guiding plate 3 that is opposite to the side wall 6a. The one of the attenuation parts 20a to 20f is arranged between the at least one of the side surfaces 3c, 3e, and 3f other than the light incident side surface 3a and the side wall 6a of the frame member. Thus, it is possible to attenuate light emitted from a space between the light shielding part 6c and the one of the side surfaces 3c, 3e, and 3f.

In the planar illumination apparatus 1 according to the embodiment, the one of the attenuation parts 20b to 20f includes a light absorbing member that is arranged close to the at least one of the side surfaces 3c, 3e, and 3f other than the light incident side surface 3a. Thus, when light emitted from the one of the side surface 3c, 3e, and 3f is absorbed, light emitted toward the emitting surface 3b, which is the positive direction of the Z-axis, is able to be attenuated, so that it is possible to improve uniformity of the luminance.

In the planar illumination apparatus 1 according to the embodiment, the frame member includes the bottom wall 6b on a reverse side of the light extracting surface of the light guiding plate 3. The attenuation part 20b is arranged on the bottom wall 6b of the frame member. Thus, when light emitted from the side surface 3c is absorbed, light emitted toward the emitting surface 3b, which is the positive direction of the Z-axis, is able to be attenuated, so that it is possible to improve uniformity of the luminance.

The planar illumination apparatus 1 according to the embodiment further includes the reflection part 4. The reflection part 4 is arranged along a reverse face of the light extracting surface so as to protrude from the at least one of the side surface 3c, 3e, and 3f other than the light incident side surface 3a toward the side wall 6a of the frame member that is opposite to the at least one of the side surface 3c, 3e, and 3f. The reflection part 4 reflects the light. The attenuation part 20c is arranged on a protruding part of the reflection part 4. Thus, when light emitted from the side surface 3c is absorbed, light emitted toward the emitting surface 3b, which is the positive direction of the Z-axis, is able to be attenuated, so that it is possible to improve uniformity of the luminance.

In the planar illumination apparatus 1 according to the embodiment, the attenuation part 20 is arranged so as to cover at least a part of the at least one of the side surface 3c, 3e, and 3f other than the light incident side surface 3a. Thus, light emitted from the side surface 3c of the light guiding plate 3 is able to be reduced, so that it is possible to attenuate light emitted from a space between the light shielding part 6c and the side surface 3c.

The planar illumination apparatus 1 according to the embodiment further includes the reflection part 4. The reflection part 4 is arranged on a reverse side of the light extracting surface and is arranged at an inner position than the at least one of the side surface 3c, 3e, and 3f other than the light incident side surface 3a so as to reflect the light toward the light guiding plate 3. The frame member includes the bottom wall 6b on the reverse side of the light extracting surface. The attenuation part 20a is a region on the bottom wall 6b of the frame member that is not overlapped with the reflection part 4. Thus, when the attenuation part 20a is formed as a part of the frame 6, it is possible to attenuate the light without additionally providing any new member, so that it is accordingly possible to improve uniformity of the luminance while reducing a product cost.

According to one aspect of the embodiments, it is possible to provide a planar illumination apparatus that is able to enhance uniformity of the luminance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination apparatus comprising:
   a light guiding plate including:
      a light extracting surface; and
      a light incident side surface on which light emitted from a light source is made incident, the light incident side surface being a side surface intersecting with the light extracting surface;
   a frame member including side walls that are arranged to be along side surfaces other than the light incident side surface of the light guiding plate, the side walls being separated from the side surfaces; and
   an attenuation part that is arranged close to at least one of the side surfaces other than the light incident side surface to attenuate light emitted from the at least one side surface.

2. The planar illumination apparatus according to claim 1, wherein
   the attenuation part is arranged between the at least one side surface other than the light incident side surface and a side wall of the side walls of the frame member.

3. The planar illumination apparatus according to claim 1, wherein
   the attenuation part includes a light absorbing member that is arranged close to the at least one side surface other than the light incident side surface.

4. The planar illumination apparatus according to claim 3, wherein
   the frame member includes a bottom wall on a reverse side of the light extracting surface of the light guiding plate, and
   the attenuation part is arranged on the bottom wall of the frame member.

5. The planar illumination apparatus according to claim 3, further comprising:
   a reflection part that is arranged along a reverse face of the light extracting surface so as to protrude from the at least one side surface other than the light incident side surface toward a side wall of the side walls of the frame member that is opposite to the at least one side surface, the reflection part reflecting the light, wherein
   the attenuation part is arranged on a protruding part of the reflection part.

6. The planar illumination apparatus according to claim 3, wherein
   the attenuation part is arranged so as to cover at least a part of the at least one side surface other than the light incident side surface.

7. The planar illumination apparatus according to claim 1, further comprising:
   a reflection part that is arranged on a reverse side of the light extracting surface and is arranged at an inner position than the at least one side surface other than the light incident side surface so as to reflect the light toward the light guiding plate, wherein
   the frame member includes a bottom wall on the reverse side of the light extracting surface, and
   the attenuation part is a region on the bottom wall of the frame member that is not overlapped with the reflection part.

8. The planar illumination apparatus according to claim 1, further comprising:
   an optical sheet that is arranged close to the light extracting surface of light guiding plate to control the light emitted from the light extracting surface, wherein
   the attenuation part is provided to the optical sheet.

9. The planar illumination apparatus according to claim 8, wherein
   the optical sheet has a protrusion part that protrudes from the at least one of the side surface other than the light incident side surface of the light guiding plate toward the side wall of the frame member that is opposite to the at least one of the side surface, wherein
   the attenuation part is provided to the protrusion part of the optical sheet.

10. The planar illumination apparatus according to claim 1, wherein
    the attenuation part is formed in a predetermined pattern.

11. The planar illumination apparatus according to claim 1, wherein
    the frame member includes:
      a side wall of the side walls that is opposite to the at least one side surface other than the light incident side surface; and
      an extending part that extends from an end part of the side wall on a side of the light extracting surface to a position between the side wall and a side surface of the light guiding plate that is opposite to the side wall.

* * * * *